United States Patent
Baba et al.

(10) Patent No.: US 7,387,976 B2
(45) Date of Patent: *Jun. 17, 2008

(54) COMPOSITE FIBER STRUCTURE AND METHOD FOR PRODUCING THE SAME

(75) Inventors: Kenji Baba, Osaka (JP); Atsushi Suzuki, Osaka (JP)

(73) Assignee: Teijin Fibers Limited, Osaka (JP)

( * ) Notice: Subject to any disclaimer, the term of this patent is extended or adjusted under 35 U.S.C. 154(b) by 66 days.

This patent is subject to a terminal disclaimer.

(21) Appl. No.: 11/587,390

(22) PCT Filed: Apr. 21, 2005

(86) PCT No.: PCT/JP2005/008099

§ 371 (c)(1),
(2), (4) Date: Oct. 24, 2006

(87) PCT Pub. No.: WO2005/102683

PCT Pub. Date: Nov. 3, 2005

(65) Prior Publication Data

US 2007/0166540 A1    Jul. 19, 2007

(30) Foreign Application Priority Data

Apr. 26, 2004 (JP) .............................. 2004-129450
Oct. 5, 2004 (JP) .............................. 2004-292385

(51) Int. Cl.
*B32B 5/26* (2006.01)

(52) U.S. Cl. ..................... 442/268; 156/251; 156/304.6; 156/296; 428/373; 428/370

(58) Field of Classification Search ................ 428/370, 428/373, 374, 394; 442/268, 274, 319, 328, 442/329, 363, 352, 353, 358; 156/62.2–62.6, 156/251, 296, 304.6, 308.2, 167; 2/73, 267, 2/463

See application file for complete search history.

(56) References Cited

U.S. PATENT DOCUMENTS 3,558,419 A * 1/1971 Okazaki ..................... 428/374
3,671,620 A * 6/1972 Inoue ..................... 264/172.17
4,297,412 A * 10/1981 Achard et al. ............... 428/370

(Continued)

FOREIGN PATENT DOCUMENTS

JP           03036647 A  *  3/1991

(Continued)

*Primary Examiner*—N Edwards
(74) *Attorney, Agent, or Firm*—Sughrue Mion, PLLC

(57) ABSTRACT

A web containing comprising side-by-side or eccentric core/shell conjugate short fibers A, which contain two kinds of polyester different from each other in intrinsic viscosity, and elastic conjugate fibers B, which contain a thermoplastic elastomer having a melting point lower by 40° C. or more than the two kinds of polyester, and a nonelastic polyester, with at least the thermoplastic elastomer being exposed on a surface of the fibers, is subjected to a heat treatment at a temperature equal to or higher than the melting point of the thermoplastic elastomer, so as to obtain a polyester elastic fiber structure, and then polyester woven or knitted fabrics are laminated adhered on both surfaces of the polyester elastic fiber structure with a polyester adhesive, followed by heat molding into a curved shape by a molding process depending on necessity, so as to obtain a composite fiber structure.

16 Claims, 1 Drawing Sheet

U.S. PATENT DOCUMENTS 4,861,660 A * 8/1989 Ishii .......................... 428/371
6,887,423 B2 * 5/2005 Van Trump et al. ........ 264/555

FOREIGN PATENT DOCUMENTS

| JP | 03069647 A | * | 3/1991 |
| JP | 74620/1991 | | 7/1991 |
| JP | 5-195397 | | 8/1993 |
| JP | 5-263345 | | 10/1993 |
| JP | 5-263345 A | | 10/1993 |
| JP | 28525/1995 | | 5/1995 |
| JP | 8-294586 A | | 11/1996 |
| JP | 8-318066 | | 12/1996 |
| JP | 8-318066 A | | 12/1996 |
| JP | 10-310965 A | | 11/1998 |
| JP | 2005307408 A | * | 11/2005 |
| JP | 2006348426 A | * | 12/2006 |
| WO | WO 03/011063 A1 | | 2/2003 |

* cited by examiner

COMPOSITE FIBER STRUCTURE AND METHOD FOR PRODUCING THE SAME

TECHNICAL FIELD

The present invention relates to a composite fiber structure and a method for producing the same. In particular, it relates to such a composite fiber structure that is excellent in softness and elasticity without impairing air permeability, washing durability, shape maintenance property and recyclability, and is favorably used as cups, and to a method for producing the same.

BACKGROUND ART

Clothes for women having cups formed of a composite fiber structure for covering breasts have been in widespread use, such as an underwear, e.g., a brassiere, a long-line brassiere, a bodysuit, a three-in-one, a brateddy, a bracamisole, a braslip and a bustier, and an outerwear, e.g., a leotard, a swimsuit, an evening dress and a bustier type wear. As the composite fiber structure, the following products have been produced and brought to market.

As the most popular product, a composite fiber structure having elasticity formed of polyurethane has been well known. The composite fiber structure is produced as a curved composite fiber structure having an integral structure through such steps as slicing and machining from a large urethane block. However, the composite fiber structure has problems inherent to urethane, such as yellowing, deterioration in light resistance, and durability to dry cleaning. It furthermore has a problem in stuffy feeling due to absence in air permeability. Among these problems, the problem of yellowing is a serious one, and upon using a urethane cup, it is necessary in use that the urethane cup is covered with cloth in layers to hide the yellowing from the exterior.

In recent years, various kinds of clothing and fibers are recovered and recycled. In general, general clothing containing various kinds of materials is often recycled for use as industrial rags and work gloves. However, a cup formed mainly of a urethane pad cannot be recycled and should be burnt out or landfilled. The burnout process brings about a problem of generation of a toxic gas, such as cyan gas. The landfill process brings about a problem in oppressing industrial waste disposal plants. These processes are harmful to the global environment.

It has been known that another composite fiber structure for cups is produced by accumulating plural thin nonwoven cloth sheets to 4 to 8 layers to form a curved shape, and adhering the sheets with an adhesive and simultaneously molding with heat, and still another one is produced by accumulating card webs through mixing binder fibers with cotton, and melting the binder fibers for hot-adhering upon molding with heat. However, these composite fiber structures suffer large shape change upon washing to provide a problem in shape maintenance property.

Patent Documents 1 and 2 propose to obtain a composite fiber structure for cups by using an elastic fiber structure containing nonelastic polyester crimped short fibers as a matrix having dispersed and mixed therein elastic conjugate fibers containing a thermoplastic elastomer exposed on the surface of the fibers. However, the composite fiber structure is still insufficient in softness and elasticity, and proposal of such a composite fiber structure is being demanded that is further improved in softness and elasticity.

Moreover, as a composite fiber structure improved in cushioning property, such a structure is proposed that is obtained by adhering a cloth to a fiber structure containing fibers oriented in the thickness direction (for example, in Patent Document 3), but it is inferior in appearance due to an irregular surface.

As a fiber structure containing fibers oriented in the thickness direction, a structure obtained by slicing the surface to form a cut surface (for example, in Patent Document 4).

[Patent Document 1] JP-A-5-195397
[Patent Document 2] International Publication 03/011063
[Patent Document 3] JP-A-8-318066
[Patent Document 4] JP-A-5-263345

DISCLOSURE OF THE INVENTION

An object of the invention is to provide such a composite fiber structure that is excellent in softness and elasticity without impairing air permeability, washing durability, shape maintenance property and recyclability, and to provide a method for producing the same. The object is attained by the composite fiber structure and a method for producing the same according to the invention.

A composite fiber structure of the invention contains a polyester elastic fiber structure having adhered on both surfaces thereof polyester woven or knitted fabrics with a polyester adhesive, characterized in that the polyester elastic fiber structure satisfies the following requirements (1) to (5):

(1) the polyester elastic fiber structure contains side-by-side or eccentric core/shell conjugate short fibers A, which contain two kinds of polyester different from each other in intrinsic viscosity, have microcrimps of from 30 to 60 crimps per 25 mm exhibited by latent crimps, and are applied with mechanical crimps of from 7 to 15 crimps per 25 mm, as a matrix, and dispersed and mixed therein elastic conjugate fibers B, which contain a thermoplastic elastomer having a melting point lower by 40° C. or more than the two kinds of polyester, and a nonelastic polyester, with at least the thermoplastic elastomer being exposed on a surface of the fibers, (2) has thermally fixed points formed by heat-melting the conjugate short fibers A and the elastic conjugate fibers B intersecting with each other, (3) has thermally fixed points formed with the elastic conjugate fibers B intersecting with each other, (4) has a mixing ratio of the conjugate short fibers A and the elastic conjugate fibers B of from 90/10 to 10/90, and (5) has a single filament fineness of the conjugate short fibers A of from 2 to 15 dtex.

It is preferred that both the two kinds of polyester different from each other in intrinsic viscosity forming the conjugate short fibers A are polyethylene terephthalate. It is also preferred that constitutional fibers of the polyester elastic fiber structure have attached on a surface thereof a surface treating agent containing a polyesterester block copolymer as a major component, in an amount of from 0.02 to 5.0% by weight based on a total weight of the polyester elastic fiber structure. It is also preferred that the conjugate short fibers A and the elastic conjugate fibers B contained in the polyester elastic fiber structure are oriented in a thickness direction of the polyester elastic fiber structure. It is also preferred that a surface of the polyester elastic fiber structure, to which the polyester woven or knitted fabrics are adhered, is a sliced cut surface.

A fiber product of the invention is a fiber product selected from the group consisting of a cup for breast, a shoulder pad, a hip pad, a pad for an office chair or a vehicle chair, a partition panel, an athletic supporter and a surface material for shoes, the fiber product containing the composite fiber structure.

A method for producing a composite fiber structure of the invention is characterized by heat-treating a web containing side-by-side or eccentric core/shell conjugate short fibers A, which contain two kinds of polyester different from each other in intrinsic viscosity by from 0.1 to 0.4 and are applied with mechanical crimps of from 7 to 15 crimps per 25 mm, and elastic conjugate fibers B, which contain a thermoplastic elastomer having a melting point lower by 40° C. or more than the two kinds of polyester, and a nonelastic polyester, with the thermoplastic elastomer being exposed on a surface of the fibers, at a temperature equal to or higher than the melting point of the thermoplastic elastomer, so as to obtain a polyester elastic fiber structure satisfying the following requirements (1) to (5):

(1) the polyester elastic fiber structure contains side-by-side or eccentric core/shell conjugate short fibers A, which contain two kinds of polyester polymers different from each other in intrinsic viscosity, have microcrimps of from 30 to 60 crimps per 25 mm exhibited by latent crimps, and are applied with mechanical crimps of from 7 to 15 crimps per 25 mm, as a matrix, and dispersed and mixed therein elastic conjugate fibers B, which contain a thermoplastic elastomer having a melting point lower by 40° C. or more than the two kinds of polyester polymers, and a nonelastic polyester, with at least the thermoplastic elastomer being exposed on a surface of the fibers, (2) has thermally fixed points formed by heat-melting the conjugate short fibers A and the elastic conjugate fibers B intersecting with each other, (3) has thermally fixed points formed with the elastic conjugate fibers B intersecting with each other, (4) has a mixing ratio of the conjugate short fibers A and the elastic conjugate fibers B of from 90/10 to 10/90, and (5) has a single filament fineness of the conjugate short fibers A of from 2 to 15 dtex, and then laminating and adhering on both surfaces of the polyester elastic fiber structure polyester woven or knitted fabrics with a polyester adhesive as a hot-melt resin binder.

It is preferred that the web has a fiber density in a range of from 0.009 to 0.04 g/cm$^3$. It is also preferred that a heat-treating temperature of the web is a temperature that is equal to or higher than a melting point of the thermoplastic elastomer contained in the elastic conjugate fibers B, and is lower by 30° C. or more than the two kinds of polyester contained in the conjugate short fibers A. It is also preferred that the polyester elastic fiber structure has attached on a surface thereof a surface treating agent containing a polyesterester block copolymer as a major component, in an amount of from 0.02 to 5.0% by weight based on a total weight of the polyester elastic fiber structure. It is also preferred that the conjugate short fibers A and the elastic conjugate fibers B contained in the polyester elastic fiber structure are oriented in a thickness direction of the polyester elastic fiber structure. It is also preferred that a surface of the polyester elastic fiber structure, to which-the polyester woven or knitted fabrics are adhered, is a sliced cut surface.

BEST MODE FOR CARRYING OUT THE INVENTION

Figure 1:
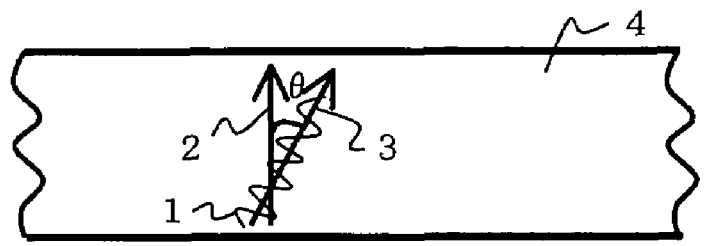
FIG. 1 is an illustrative view describing a direction of orientation of conjugate short fibers A or elastic conjugate fibers B in a polyester elastic fiber structure, in which numeral 1 denotes the conjugate short fibers A or the elastic conjugate fibers B, 2 denotes the thickness direction of the polyester elastic fiber structure, 3 denotes the orientation direction of the conjugate short fibers A or the elastic conjugate fibers B, and 4 denotes the polyester elastic fiber structure.

The composite fiber structure of the invention contains the following polyester elastic fiber structure having adhered on both surfaces thereof polyester woven or knitted fabrics with a polyester adhesive.

The polyester elastic fiber structure (1) contains side-by-side or eccentric core/shell conjugate short fibers A, which contain two kinds of polyester polymers different from each other in intrinsic viscosity, have microcrimps of from 30 to 60 crimps per 25 mm exhibited by latent crimps, and are applied with mechanical crimps of from 7 to 15 crimps per 25 mm, as a matrix, and dispersed and mixed therein elastic conjugate fibers B, which contain a thermoplastic elastomer having a melting point lower by 40° C. or more than the two kinds of polyester polymers, and a nonelastic polyester, with at least the thermoplastic elastomer being exposed on a surface of the fibers, (2) has thermally fixed points formed by heat-melting the conjugate short fibers A and the elastic conjugate fibers B intersecting with each other, (3) has thermally fixed points formed with the elastic conjugate fibers B intersecting with each other, (4) has a mixing ratio of the conjugate short fibers A and the elastic conjugate fibers B of from 90/10 to 10/90, and (5) has a single filament fineness of the conjugate short fibers A of from 2 to 15 dtex (preferably from 3 to 8 dtex).

The conjugate short fibers A constituting the matrix contain two kinds of polyester polymers different from each other in intrinsic viscosity, and have microcrimps of from 30 to 60 crimps per 25 mm (preferably from 40 to 55 crimps per 25 mm) exhibited by latent crimps.

It is particularly important in the conjugate short fibers A that the conjugate short fibers A have the aforementioned microcrimps. The microcrimps are exhibited through the heat treatment, and the conjugate short fibers A have such a structure that is rich in retractility and elasticity like a spring owing to the microcrimps. The polyester elastic fiber structure thus is excellent in softness and elasticity owing to intertangling of the fibers. In the case where the number of the microcrimps is less than 30 crimps per 25 mm, it is not preferred since sufficient softness and elasticity cannot be obtained. In the case where the number of the microcrimps is larger than 60 crimps per 25 mm, the thermal contraction upon molding the complex fiber structure becomes large, which might bring about a problem of wrinkling and dimensional change to make molding difficult.

It is necessary that the conjugate short fibers A are applied with mechanical crimps of from 3 to 40 crimps per 25 mm (preferably from 7 to 15 crimps per 25 mm) by an ordinary compression crimper system. In the case where the number of the crimps is less than 3 crimps per 25 mm, intertangling of the fibers becomes insufficient to deteriorate the card pass through property, which might bring about failure in production of a fiber structure with high quality. In the case where the number of the crimps exceeds 40 crimps per 25 mm, on the other hand, intertangling of the fibers becomes excessive to fail to attain sufficient carding, which might bring about failure in production of a fiber structure with high quality.

The two kinds of polyester different from each other in intrinsic viscosity constituting the conjugate short fibers A are not particularly limited as far as the microcrimps can be obtained, and the difference in intrinsic viscosity is preferably in a range of from 0.1 to 0.4. In the case where the difference in intrinsic viscosity is less than 0.1, the microcrimps might not be sufficiently exhibited to make the number of the microcrimps smaller than the aforementioned range. In the case where the difference in intrinsic viscosity is larger than 0.4, the number of the microcrimps might be larger than the aforementioned range.

Preferred examples of the two kinds of polyester different from each other in intrinsic viscosity include a polyethylene terephthalate series polyester, a polybutyrene terephthalate series polyester and a polytrimethylene series polyester. The polyethylene terephthalate series polyester referred herein means such a polyester that the content of an ethylene terephthalate repeating unit is 90% by mol or more (preferably 95% by mol or more) based on the total repeating units of the polyester, the polytrimethylene terephthalate series polyester referred herein means such a polyester that the content of a trimethylene terephthalate repeating unit is 90% by mol or more (preferably 95% by mol or more) based on the total repeating units of the polyester, and the polybutyrene terephthalate series polyester referred herein means such a polyester that the content of a butyrene terephthalate repeating unit is 90% by mol or more (preferably 95% by mol or more) based on the total repeating units of the polyester.

For selecting the two kinds of polyester different from each other in intrinsic viscosity, those having different polymerization degrees may be selected in the case of the same kind of polyester, and in the case of different kinds of polyester, they may be selected in such a manner that at least one of the acid component and the diol component of them is different between them.

In the polyester, the terephthalic acid component and the ethylene glycol component may be copolymerized depending on necessity with 5% by mol or less of the third component, examples of which include an aromatic dicarboxylic acid, such as isophthalic acid, 5-sodiumsulfoisophthalic acid, naphthalenedicarboxylic acid, orthophthalic acid, diphenyldicarboxylic acid, diphenyletherdicarboxylic acid, diphenylsulfonedicarboxylic acid, benzophenonedicarboxylic acid, phenylindanedicarboxylic acid, a metallic 5-sulfoxyisophthalate salt and phosphonium 5-sulfoxyisophthalate salt, an aliphatic dicarboxylic acid, such as adipic acid, heptanedioic acid, octanedioic acid, azelaic acid, sebacic acid, undecanedioic acid and dodecanedioic acid, an alicyclic dicarboxylic acid, such as cyclohexanedicarboxylic acid and cyclohexanedimethylenedioic acid, an aliphatic glycol, such as trimethylene glycol, tetramethylene glycol, pentamethylene glycol, hexamethylene glycol, octamethylene glycol, decamethylene glycol, neopentylene glycol, diethylene glycol, triethylene glycol, polyethylene glycol and polytetramethylene glycol, an alicyclic glycol, such as cyclohexanediol and cyclohexanedimethanol, an aromatic glycol, such as o-xylylene glycol, m-xylylene glycol, p-xylylene glycol, 1,4-bis(2-hydroxyethoxy)benzene, 1,4-bis(2-hydroxyethoxyethoxy)benzene, 4,4'-bis(2-hydroxyethoxy)biphenyl, 4,4'-bis(2-hydroxyethoxyethoxy)biphenyl, 2,2-bis[4-(2-hydroxyethoxy)phenyl]propane, 2,2-bis[4-(2-hydroxyethoxyethoxy)phenyl]propane, 1,3-bis(2-hydroxyethoxy)benzene, 1,3-bis(2-hydroxyethoxyethoxy)benzene, 1,2-bis(2-hydroxyethoxy)benzene, 1,2-bis(2-hydroxyethoxyethoxy)benzene, 4,4'-bis(2-hydroxyethoxy)diphenylsulfone and 4,4'-bis(2-hydroxyethoxyethoxy)diphenylsulfone, and a diphenol, such as hydroquinone, 2,2-bis(4-hydroxyphenyl)propane, resorcin, catechol, dihydroxynaphthalene, dihydroxybiphenyl and dihydroxydiphenylsulfone. These may be used singly or in combination of two or more of them. The polyester may contain a small amount of an additive depending on necessity, such as a lubricant, a pigment, a dye, an antioxidant, a solid phase polymerization accelerating agent, a fluorescent whitening agent, an antistatic agent, an antibacterial agent, an ultraviolet ray absorbent, a light stabilizer, a heat stabilizer, a light shielding agent and a matting agent, and in particular, a matting agent, such as titanium oxide, is preferably added.

It is necessary that the conjugate short fibers A have a side-by-side conjugate form or an eccentric core/shell conjugate form. Among these, the side-by-side conjugate form is preferably used. The two kinds of polyester different from each other in intrinsic viscosity are appropriately selected and bonded to provide latent crimps, and microcrimps are exhibited by the latent crimps by subjecting the conjugate short fibers to a heat treatment.

The weight ratio of the two kinds of polyester is generally from 20/80 to 80/20 (more preferably from 40/60 to 60/40).

The conjugate short fibers A necessarily have a single filament fineness of from 2 to 15 dtex (more preferably from 2 to 13 dtex, and particularly preferably from 3 to 7 dtex). In the case where the single filament fineness is less than 2 dtex, the composite fiber structure might have a too dense structure to fail to obtain sufficient elasticity. In the case where the single filament fineness exceeds 15 dtex, on the other hand, the texture might be deteriorated to fail to obtain a composite fiber structure with good texture. In the conjugate short fibers A, the fiber length is preferably cut to a length of from 3 to 100 mm.

The elastic conjugate fibers B constituting the polyester elastic fiber structure are formed of a thermoplastic elastomer and a nonelastic polyester. On the surface of the elastic conjugate fibers B, the thermoplastic elastomer preferably occupies at least ½ of the surface area thereof. The weight ratio of the thermoplastic elastomer and the nonelastic polyester is preferably from 30/70 to 70/30. The form of the elastic conjugate fibers is not particularly limited, and the thermoplastic elastomer and the nonelastic polyester preferably have a side-by-side conjugate form or a core/shell conjugate form, and more preferably a core/shell conjugate form. The core/shell elastic conjugate fibers are constituted by the nonelastic polyester as a core and the thermoplastic elastomer as a shell, and the core may be a concentric form or an eccentric form. In particular, the elastic conjugate fibers having an eccentric form is preferred as compared to those having a concentric form owing to exhibition of elastic crimps in a coil form.

The thermoplastic elastomer is not particularly limited as far as it has a melting point lower by 40° C. or more than the two kinds of polyester constituting the conjugate short fibers A, and a polyurethane elastomer and a polyester elastomer are preferred.

The polyurethane elastomer is a polymer obtained by reacting a low melting point polyol having a molecular weight of about from 500 to 6,000, such as dihydroxypolyether, dihydroxypolyester, dihydroxypolycarbonate and dihydroxypolyesteramide, an organic diisocyanate having a molecular weight of 500 or less, such as p,p'-diphenylmethanediisocyanate, tolylenediisocyanate, isophoronediisocyanate, diphenylmethanediisocyanate hydride, xylylenediisocyanate, 2,6-diisocyanate methyl caproate and hexamethylenediisocyanate, and a chain extender having a molecular weight of 500 or less, such as glycol, aminoalcohol and triol. Particularly preferred examples of the polymer include polyurethane obtained by using polytetramethylene glycol, poly-ϵ-caprolactone or polybutyreneadipate as the polyol. In this case, p,p'-diphenylmethanediisocyanate is preferred as the organic diisocyanate, and p,p'-bishydroxyethoxybenzene or 1,4-butanediol is preferred as the chain extender.

The polyester elastomer is a polyetherester block copolymer containing a thermoplastic polyester as a hard segment, and a poly(alkyleneoxide) glycol as a soft segment, and more specifically, a terpolymer constituted by at least one kind of a dicarboxylic acid selected from an aromatic dicarboxylic acid, such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid and sodium 3-sulfoisophthalate, an alicyclic dicarboxylic acid, such as 1,4-cyclohexanedicarboxylic acid, an aliphatic dicarboxylic acid, such as succinic acid, oxalic acid, adipic acid, sebacic acid, dodecanedioic acid and dimer acid, and an ester forming derivative thereof, at least one kind of diol component selected from an aliphatic diol, such as 1,4-butanediol, butyrene glycol, ethylene glycol, trimethylene glycol, tetramethylene glycol, pentamethylene glycol, hexamethylene glycol, neopentyl glycol and decamethylene glycol, an alicyclic diol, such as 1,1-cyclohexanedimethanol, 1,4-cyclohexanedimethanol and tricyclodecanedimethanol, and an ester forming derivative thereof, and at least one kind of a poly(alkyleneoxide) glycol selected from polyethylene glycol, poly(1,2- or 1,3-propyleneoxide) glycol, poly(tetramethyleneoxide) glycol, a copolymer of ethyleneoxide and propyleneoxide, and a copolymer of ethyleneoxide and tetrahydrofuran.

The polyester elastomer is preferably a block copolymer polyether polyester having polybutyrene series terephthalate as a hard segment and polyoxybutyrene glycol as a soft segment, taking the adhesion property to the conjugate short fibers A as a matrix, the temperature characteristics and the strength into consideration. In this case, the polyester part constituting the hard segment of the polyester elastomer is preferably polybutyrene terephthalate having terephthalic acid as a major acid component and butyrene glycol as a major diol component. A part of the acid component (generally 30% by mol or less) may be replaced by other dicarboxylic acid component and oxycarboxylic acid component, and similarly, a part of the diol component (generally 30% by mol or less) may be replaced by other dioxy component than butyrene glycol. The polyether part constituting the soft segment of the polyester elastomer may be a polyether substituted by other dioxy component than butyrene glycol. The polymer may contain various kinds of stabilizers, an ultraviolet ray absorbent, a thickening and branching agent, a matting agent, a colorant and various kinds of improving agents, depending on necessity.

Examples of the nonelastic polyester as a counterpart of the thermoplastic elastomer include a polyester, such as polyethylene terephthalate, polypropylene terephthalate and polybutyrene terephthalate.

The elastic conjugate fibers B have a single filament fineness of from 2 to 15 dtex (more preferably from 2 to 13 dtex, and particularly preferably from 3 to 7 dtex). In the elastic conjugate fibers B, the fiber length is preferably cut to a length of from 3 to 100 mm.

In the composite fiber structure of the invention, the polyester elastic fiber structure contains the conjugate short fibers A and the elastic conjugate fibers B, with which thermally fixed points are formed by heat-melting the conjugate short fibers A and the elastic conjugate fibers B intersecting with each other, and thermally fixed points are formed with the elastic conjugate fibers B intersecting with each other. The conjugate short fibers A have the microcrimps as having been described, whereby retractility and elasticity like a spring can be obtained.

The mixing ratio of the conjugate short fibers A and the elastic conjugate fibers B contained in the polyester elastic fiber structure is necessarily from 90/10 to 10/90 by weight as a ratio of former/later. In the case where the weight ratio of the elastic conjugate fibers B is less than 10%, a sufficient number of thermally fixed points might not be obtained upon producing the polyester elastic fiber structure to deteriorate washing durability. In the case where the weight ratio of the elastic conjugate fibers B exceeds 90%, on the other hand, the number of the thermally fixed points is excessively increased upon producing the polyester elastic fiber structure to provide a coarse and stiff composite fiber structure.

The density of the polyester elastic fiber structure is preferably from 0.01 to 0.055 g/cm$^3$ in terms of the fiber density in a part having the maximum thickness.

It is preferred that the conjugate short fibers A and the elastic conjugate fibers B are oriented in the thickness direction of the polyester elastic fiber structure since particularly excellent softness and elasticity can be obtained. The term "oriented in the thickness direction" referred in the invention means that upon cutting the fiber structure in the thickness direction, the ratio T/W of the total number T of the conjugate short fibers A and the elastic conjugate fibers B that are oriented in parallel to the thickness direction ($0° \leq \theta \leq 45°$ in FIG. 1) and the total number W of the conjugate short fibers A and the elastic conjugate fibers B that are oriented perpendicular to the thickness direction of the fiber structure ($45° < \theta \leq 90°$ in FIG. 1) is 1.5 or more.

The composite fiber structure of the invention contains the polyester elastic fiber structure having adhered on both surfaces thereof polyester woven or knitted fabrics with a polyester adhesive. It is preferred in this case that constitutional fibers of the polyester elastic fiber structure have attached on a surface thereof a surface treating agent containing a polyetherester block copolymer as a major component, in an amount of from 0.02 to 5.0% by weight based on the total weight of the polyester elastic fiber structure. By attaching the surface treating agent containing a polyetherester block copolymer a major component to the surface of the constitutional fibers of the polyester elastic fiber structure, the constitutional fibers in the polyester elastic fiber structure can be adhered further firmly, whereby the composite fiber structure can be further improved in washing durability and shape maintenance property. The surface treating agent containing a polyetherester block copolymer a major component is most preferably attached to the entire constitutional fibers of the polyester elastic fiber structure, but improvement in adhesion among the constitutional fibers can be obtained only by attaching to the elastic conjugate fibers B. Furthermore, the advantages of the invention can be sufficiently obtained when no surface treating agent is attached to the constitutional fibers of the polyester elastic fiber structure.

Examples of the surface treating agent containing a polyetherester block copolymer a major component include polyetherester block copolymers containing terephthalic acid, isophthalic acid, metasodium sulfoisophthalate, or a lower alkyl ester thereof, and a lower alkylene glycol, polyalkylene glycol, or polyalkylene glycol monoether, which are dispersed by using a surfactant, such as an alkali metal salt of polyoxyethylene alkylphenyl ether phosphate, an alkali metal of polyoxyethylene alkylphenyl ether sulfate and/or an ammonium salt thereof, and an alkanolamine salt.

The resin binder used in the invention is necessarily a hot-melt resin binder in a powder, sheet or net form that undergoes melt adhesion with heat. In general, a resin binder in a liquid state at ordinary temperature is being widely used for lamination adhesion, but the liquid resin binder not only impairs the handling in the production process and the working environment, but also penetrates into the interior of the fiber structure to deteriorate the soft and elastic texture. The formulation of the resin binder may be a polyester resin, which is the same as the polyester elastic fiber structure, the outer fabric and the backing fabric.

The fabric that is used as the outer fabric and the backing fabric of the composite fiber structure of the invention is not particularly, limited as far as it is a fabric formed of such polyester fibers that have a melting point higher than the hot-melt binder resin used in the invention. The formulation of the fabric used as the outer and backing fabrics preferably contains only polyester. The fabric for the outer and backing fabrics is preferably a woven or knitted fabric, and a nonwoven fabric or the like may also be used.

In the case where the surface of the polyester elastic fiber structure, to which the polyester woven or knitted fabrics are adhered, is a sliced cut surface, the polyester woven or knitted fabrics are adhered to the flat cut surface of the polyester elastic fiber structure, and the resulting composite fiber structure also has a flat surface, whereby the appearance thereof is favorably improved. Furthermore, the ends of the fibers constituting the polyester elastic fiber structure appear on the flat cut surface of the fiber structure, whereby the friction between the fibers contained in the fiber structure and the adhesion layer is increased, which favorably facilitates adhesion of the polyester woven or knitted fabric.

The method for producing a composite fiber structure constituted by the composite fiber structure of the invention will be described.

Such a web is prepared that contains side-by-side or eccentric core/shell conjugate short fibers A, which contain two kinds of polyester different from each other in intrinsic viscosity by from 0.1 to 0.4 and are applied with mechanical crimps of from 7 to 15 crimps per 25 mm, and elastic conjugate fibers B, which contain a thermoplastic elastomer having a melting point lower by 40° C. or more than the two kinds of polyester, and a nonelastic polyester, with at least the thermoplastic elastomer being exposed on a surface of the fibers. The conjugate short fibers A and the elastic conjugate fibers B may be the same ones as those having been described.

In this case, it is important that the two kinds of polyester are different from each other in intrinsic viscosity by from 0.1 to 0.4. In the case where the difference in intrinsic viscosity is less than 0.1, the microcrimps might not be sufficiently exhibited even though a heat treatment is carried out. In the case where the difference in intrinsic viscosity is larger than 0.4, it is not preferred, while exhibition of the microcrimps is facilitated, since bending troubles are liable to occur in the fiber spinning process, and the thermal contraction coefficient is simultaneously increased, whereby such problems as wrinkling and dimensional change might occur upon producing the polyester elastic fiber structure before molding the composite fiber structure and upon molding the composite fiber structure.

The conjugate short fibers A and the elastic conjugate fibers B, which have been attached with a surface treating agent containing a polyesterester block copolymer as a major component, in an amount of from 0.02 to 5.0% by weight based on a total weight of the polyester elastic fiber structure, are mixed at a prescribed ratio, and are formed into a web through an ordinary carding process with accumulation to the necessary basis weight by cloth rare. At this time, mechanical entanglement may be provided depending on necessity by such a method as needle punching and/or water needling for preventing interlayer detachment of the structure from occurring. The web preferably has a fiber density in a range of from 0.009 to 0.04 g/cm$^3$. Subsequently, a nonwoven cloth sheet is preliminarily fused with a heat treating apparatus at a temperature equal to or higher than the melting point of the thermoplastic elastomer (preferably such a temperature that is equal to or higher than the melting point of the thermoplastic elastomer and is lower by 30° C. or more than both the melting points of the two kinds of polyester constituting the conjugate short fibers A) to exhibit microcrimps of the conjugate short fibers A and to fixing the entangled points thermally, whereby the polyester elastic fiber structure having the structure shown in the items (1) to (5) is obtained and then wound with a winder. A structure rich in retractility and elasticity like a spring is obtained owing to the microcrimps. Simultaneously, the fibers are intricately entangled with each other, and thus the number of the thermally fixed points is increased as compared to an ordinary fiber structure using a matrix having no microcrimp. The thermally fixed points remain after heat molding into a curved shape in a cup form through a molding process with a metallic mold, so as to provide excellent softness and elasticity.

Subsequently, in order to adhere an outer fabric and a backing fabric formed of polyester fibers to both the surfaces of the polyester elastic fiber structure, a hot-melt resin binder is inserted between the fiber structure and the outer and backing fabrics. The assembly having the resin binder intervening therebetween is heated to melt the binder, whereby the fiber structure and the outer and backing fabrics are adhered to each other to obtain a multilayer fiber structure. The multilayer fiber structure has the polyester elastic fiber structure having adhered on both surfaces thereof with a polyester adhesive the outer and backing fabrics formed of polyester fibers. Thereafter, depending on necessity, the multilayer fiber structure is set in a metallic mold for heat molding, and the outer and backing fabrics and the fiber structure are integrally heat-molded to obtain a prescribed composite fiber structure.

Preferred examples of the method for orienting the conjugate short fibers A and the elastic conjugate fibers B in the thickness direction of the fiber structure include such a method that the conjugate short fibers A and the elastic conjugate fibers B are mixed and spun into a uniform web by roller carding, and then the web folded into a pleated form is subjected to a heat treatment to form thermally fixed points through heat fusing. For example, it is possible that the web is folded into a pleated form to orient most of fibers in the thickness direction, and the fibers are thermally adhered to each other in a heat treating furnace heated to a temperature of about 200° C., by using an apparatus disclosed in JP-W-2002-516932 (commercially available examples of which include Struto Equipment, produced by Struto International, Inc.).

The composite fiber structure of the invention can also be obtained in such a manner that the polyester elastic fiber structure is sliced in a direction that is substantially perpendicular to the thickness direction or is slightly slanted therefrom depending on necessity with a slicer equipment, and the polyester woven or knitted fabric is adhered to the sliced cut surface through an adhesive layer. In this case, the thickness of the fiber structure is appropriately selected corresponding to the purpose of the fiber structure. The cut surface may be formed on only one surface of the fiber structure, to which the polyester woven or knitted fabric is adhered, or in alternative, the cut surfaces may be formed on both front and back surfaces of the fiber structure, to which the polyester woven or knitted fabrics are adhered.

In the composite fiber structure thus obtained, the conjugate short fibers A used as a matrix of the polyester elastic fiber structure have microcrimps exhibited by latent crimps through a heat treatment and thus have a structure like a spring. Furthermore, the fibers are intricately entangled with each other, whereby the number of the thermally fixed points is increased as compared to an ordinary fiber structure using matrix fibers having no microcrimp. As a result, the composite fiber structure has excellent softness and elasticity. An ordinary fiber structure using matrix fibers having no microcrimp is simply hardened when the thickness of the fiber structure is compressed to increase the density thereof, but the composite fiber structure of the invention maintains an elastic texture.

Moreover, in the composite fiber structure of the invention, the outer fabric and the backing fabric are adhered with an adhesive component to mold into the composite fiber structure integrally, and therefore, it suffers from no dimensional change or shape change through a washing process in several tens of times.

The composite fiber structure of the invention may be subjected to an ordinary dyeing process or an ordinary raising process. Furthermore, a known functional process, such as a water repellent process, an antiflaming process, a flame proof process and a negative ion generation process, may be added.

The composite fiber structure of the invention is sewn depending on necessity to apply particularly preferably to a fiber structure for a breast cup. The application of the composite fiber structure of the invention is not limited to a breast cup, but it may be utilized as a pad, such as a cup for breast, a shoulder pad and a hip pad, a pad for an office chair or a vehicle chair for an electric train and an aircraft, a partition panel, an athletic supporter and a surface material for shoes.

EXAMPLE

Examples and comparative examples of the invention will be described in detail, but the invention is not limited to them. The measurement items in the examples were measured in the following manners.

(1) Melting Point

A melting peak was obtained by measuring with a differential thermal analyzer Model 990, produced by Du Pont, Inc. at a temperature increasing rate of 20° C. per minute. In the case where a melting temperature was not clearly observed, a temperature where the polymer began to melt and flow (softening point) measured by using a micro melting point measuring apparatus (produced by Yanagimoto Mfg. Co., Ltd.) was designated as a melting point. The melting point was obtained as an average value of five specimens (n=5).

(2) Number of Microcrimps and Mechanical Crimps

The number of microcrimps per 25 mm and the number of mechanical crimps per 25 mm were measured by the method described in JIS L1015 7.12.1. The number was obtained as an average value of five specimens (n=5).

(3) Intrinsic Viscosity

The intrinsic viscosity was measured at 35° C. with o-chlorophenol as a solvent. The intrinsic viscosity was obtained as an average value of five specimens (n=5).

(4) Washing Durability

After repeating a washing process including 20 cycles of washing for 50 minutes in 100 times by using a domestic washing machine, the shape maintenance property was visually evaluated in four grades, excellent (class 4), good (class 3), slightly poor (class 2), and poor (class 1).

(5) Elasticity

The repulsive force was measured upon pressing a cylindrical iron bar having a diameter of 10 mm onto the center part (having the maximum thickness) of the composite fiber structure by 10 mm. The measured value was obtained as an average value of five specimens (n=5).

(6) Softness

The softness relates to the repulsive property. Therefore, according to tactile evaluation, a specimen that was particularly excellent in softness and repulsive property was designated as class 4, a specimen that was excellent in softness and repulsive property was designated as class 3, a specimen that had stiff tactile or small repulsive property was designated as class 2, and a specimen that had particularly stiff tactile or particularly small repulsive property was designated as class 1.

(7) Moldability of Composite Fiber Structure

The moldability upon molding into a shape of a breast cup and the finishing state after molding were evaluated in three grades. (Class 3: good in moldability with good finishing state; Class 2: good in moldability but slightly poor in finishing state with wrinkling and change in size; Class 1: difficulty in molding with considerable wrinkling and change in size)

(8) T/W

The ratio T/W was calculated with the total number T of the conjugate short fibers A and the elastic conjugate fibers B that were oriented in parallel to the thickness direction ($0° \leq \theta \leq 45°$ in FIG. 1), and the total number W of the conjugate short fibers A and the elastic conjugate-fibers B that were oriented perpendicular to the thickness direction of the fiber structure ($45° < \theta \leq 90°$ in FIG. 1) is 1.5 or more, upon cutting the polyester elastic fiber structure in the thickness direction. In the measurement of the number of fibers, 30 fibers for each were observed in arbitrary 10 positions with a transmission optical microscope, and the numbers were counted.

(9) Cutting Property

The cutting property of the polyester elastic fiber structure upon cutting with a slicer was evaluated in three grades. (Class 3: good; Class 2: no problem; Class 1: poor)

Example 1

38% (by weight) of polybutyrene series terephthalate, which was obtained by polymerizing an acid component obtained by mixing terephthalic acid and isophthalic acid at 80/20 (% by mol) and butyrene glycol, was further reacted under heat with 62% (by weight) of polybutyrene terephthalate (molecular weight: 2,000) to obtain a thermoplastic block copolymer polyetherester elastomer. The thermoplastic elastomer had an intrinsic viscosity of 1.0, a melting point of 155° C., a breaking elongation as a film of 1,500%, a 300% elongation stress of 2.94 Pa (0.3 kg/mm$^2$), and a 300% elongation recovery rate of 75%. An elastic conjugate fiber thread was spun in an ordinary manner from the thermoplastic elastomer as a shell and ordinary polybutyrene terephthalate as a core with a weight ratio of core/shell of 50/50. The elastic conjugate fiber thread was eccentric core/shell conjugate fibers. The elastic conjugate fiber thread was stretched in twice and applied with a surface treating agent (oily agent), and then the thread was cut to 64 mm to obtain elastic conjugate fibers B having a single filament fineness of 6.6 dtex.

Separately, a side-by-side conjugate fiber thread was spun in an ordinary manner from polyethylene terephthalate having an intrinsic viscosity of 0.65 (melting point: 256° C.) as a high viscosity polyester and polyethylene terephthalate having an intrinsic viscosity of 0.45. (melting point: 256° C.) as a low viscosity polyester (i.e., a difference in intrinsic viscosity of 0.20) at a weight ratio of 50/50. The side-by-side conjugate fiber thread stretched in twice and applied with a surface treating agent (oily agent), and then the thread was applied with mechanical crimps of 10 crimps per 25 mm by using an ordinary crimper apparatus and then cut to 51 mm to obtain conjugate short fibers A having a single filament fineness of 5.0 dtex and having latent crimping capability as a matrix.

30% (by weight) of the elastic conjugate fibers B and 70% (by weight) of the conjugate short fibers A were mixed with a card to produce a web, which was then subjected to a dry heating treatment (preliminary fusion) at 175° C. under no pressurization for 60 seconds, whereby the latent crimps of the conjugate short fibers A were exhibited to form microcrimps of 48 crimps per 25 mm, and thermally fixed points were formed, so as to obtain a polyester elastic fiber aggregate having a basis weight of 350 g/m$^2$, a thickness of 20 mm and a density of 0.0175 g/cm$^3$. It was accumulated on a polyester thick fabric sheet having been subjected to a preliminary crimping process as an outer fabric and a polyester tricot fabric as a backing fabric, with polyester net hot-adhesion melting sheets (Dynac Sheet G-4000, a trade name, produced by Toyobo Co., Ltd.) intervening between them, and then subjected to lamination adhesion at 160° C. to obtain a composite fiber structure having the outer and backing fabrics adhered thereto. The composite fiber structure was placed in a metallic mold for molding a composite fiber structure under heat and subjected to heat molding at 200° C. for 30 seconds, so as to produce a composite fiber structure having a curved breast cup shape. Thereafter, it was evaluated for washing durability by using a domestic washing machine, elasticity and softness. The evaluation results are shown in Table 1.

Comparative Examples 1 to 7

Composite fiber structures were obtained in the same manner as in Example 1 except that: in Comparative Example 1, ordinary solid (circular cross section) regular polyethylene terephthalate short fibers (single filament fineness: 6.6 dtex) were used as a matrix; in Comparative Example 2, conjugate short fibers having latent crimping capability and having a single filament fineness of 1.1 dtex were used as a matrix; in Comparative Example 3, conjugate short fibers having latent crimping capability and having a single filament fineness of 20.0 dtex were used as a matrix; in Comparative Example 4, conjugate short fibers having latent crimping capability and having a difference in intrinsic viscosity of 0.05 as a matrix; in Comparative Example 5, conjugate short fibers having latent crimping capability and having a difference in intrinsic viscosity of 0.6 as a matrix; in Comparative Example 6, fibers having mechanical crimps of 4.5 crimps per 25 mm were used as a matrix; and in Comparative Example 7, fibers having mechanical crimps of 20 crimps per 25 mm were used as a matrix. In the carding process in production, a large amount of fibers not unraveled was formed in Comparative Example 6, and neps were frequently formed in Comparative Example 7. The evaluation results are shown in Table 1.

Examples 2 to 4 and Comparative Example 8

The both kinds of fibers used in Example 1 were attached with a surface treating agent containing a polyetherester block copolymer as a major component in an amount of about 0.16% by weight based on a total weight of the fibers, and were mixed and spun with a card at a ratio (by weight) of the elastic conjugate fibers in the polyester elastic fiber structure of 10% in Example 2, 20% in Example 3, 50% in Example 4 or 5% in Comparative Example 8, so as to produce a web, which was then subjected to a heating treatment (preliminary fusion) at 175° C. for 90 seconds on a mesh conveyer, whereby the latent crimps of the conjugate short fibers A were exhibited. It was accumulated on a thick fabric sheet using polyester wooly yarn as an outer fabric and a polyester tricot fabric as a backing fabric, with polyester net hot-adhesion melting sheets (Dynac Sheet G-4000, a trade name, produced by Toyobo Co., Ltd.) intervening between them, and then subjected to lamination adhesion at 160° C. to obtain a composite fiber structure having the outer and backing fabrics adhered thereto. The composite fiber structure was placed in a heat molding apparatus and subjected to a heat treatment at 190° C. for 10 seconds, so as to produce a composite fiber structure having a curved breast cup shape. Thereafter, it was evaluated for washing durability by using a domestic washing machine, elasticity and softness. The evaluation results are shown in Table 1.

TABLE 1

| | Conjugate short fibers A | | | | | | | Elastic conjugate fibers B | | | | | |
|---|---|---|---|---|---|---|---|---|---|---|---|---|---|
| | Higher intrinsic viscosity | Lower intrinsic viscosity | Difference in intrinsic viscosity | Number of mechanical crimps (/25 mm) | Number of micro-crimps (/25 mm) | Single filament fineness (dtex) | Mixing ratio (%) | Single filament fineness (dtex) | Mixing ratio (%) | Cup mold-ability | Elasticity (mN) | Softness | Washing durability |
| Example 1 | 0.65 | 0.45 | 0.20 | 10 | 48 | 5 | 70 | 6.6 | 30 | Class 3 | 343 | Class 4 | Class 4 |
| Comparative Example 1 | 0.65 | — | — | 8 | 0 | 6.6 | 70 | 6.6 | 30 | Class 3 | 333 | Class 1 | Class 1 |
| Comparative Example 2 | 0.65 | 0.45 | 0.20 | 14 | 54 | 1.1 | 70 | 6.6 | 30 | Class 3 | 314 | Class 3 | Class 2 |
| Comparative Example 3 | 0.65 | 0.45 | 0.20 | 8 | 38 | 20 | 70 | 6.6 | 30 | Class 3 | 431 | Class 2 | Class 2 |
| Comparative Example 4 | 0.65 | 0.60 | 0.05 | 10 | 14 | 5 | 70 | 6.6 | 30 | Class 3 | 323 | Class 2 | Class 2 |
| Comparative Example 5 | 0.95 | 0.35 | 0.60 | 10 | 78 | 5 | 70 | 6.6 | 30 | Class 1 | 294 | Class 3 | Class 3 |
| Comparative Example 6 | 0.65 | 0.45 | 0.20 | 4.5 | 50 | 5 | 70 | 6.6 | 30 | Class 3 | 323 | Class 2 | Class 3 |
| Comparative Example 7 | 0.65 | 0.45 | 0.20 | 20 | 44 | 5 | 70 | 6.6 | 30 | Class 3 | 353 | Class 2 | Class 3 |
| Example 2 | 0.65 | 0.45 | 0.20 | 10 | 48 | 5 | 90 | 6.6 | 10 | Class 3 | 294 | Class 3 | Class 3 |
| Example 3 | 0.65 | 0.45 | 0.20 | 10 | 48 | 5 | 20 | 6.6 | 20 | Class 3 | 323 | Class 4 | Class 4 |
| Example 4 | 0.65 | 0.45 | 0.20 | 10 | 48 | 5 | 20 | 6.6 | 50 | Class 3 | 461 | Class 4 | Class 4 |
| Comparative Example 8 | 0.65 | 0.45 | 0.20 | 10 | 48 | 5 | 95 | 6.6 | 5 | Class 3 | 265 | Class 2 | Class 1-2 |

Example 5

Figure 2:
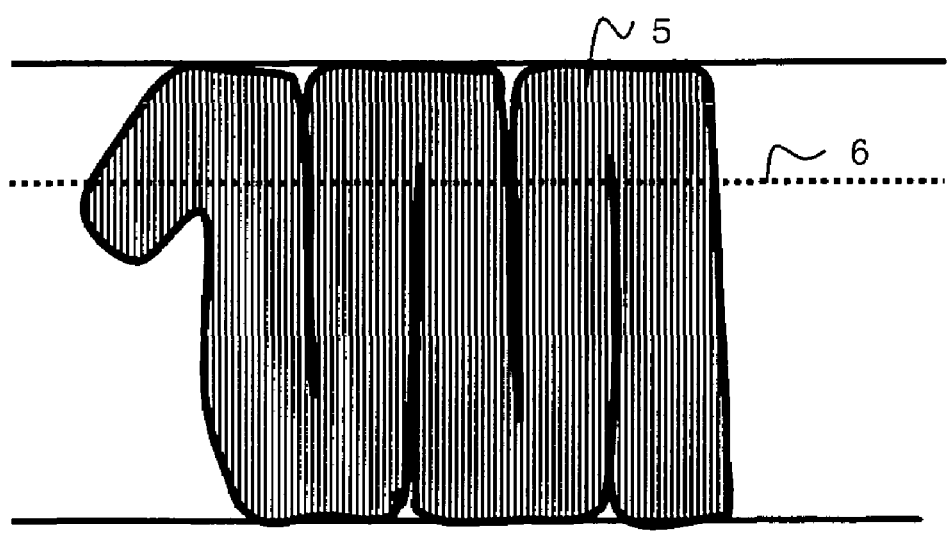
FIG. 2 is an illustration schematically showing a state where a web is crimped to orient most of fibers in the thickness direction, in which numeral 5 denotes a peak of the web, and 6 denotes a plane, at which the web is sliced.
Figure 3:
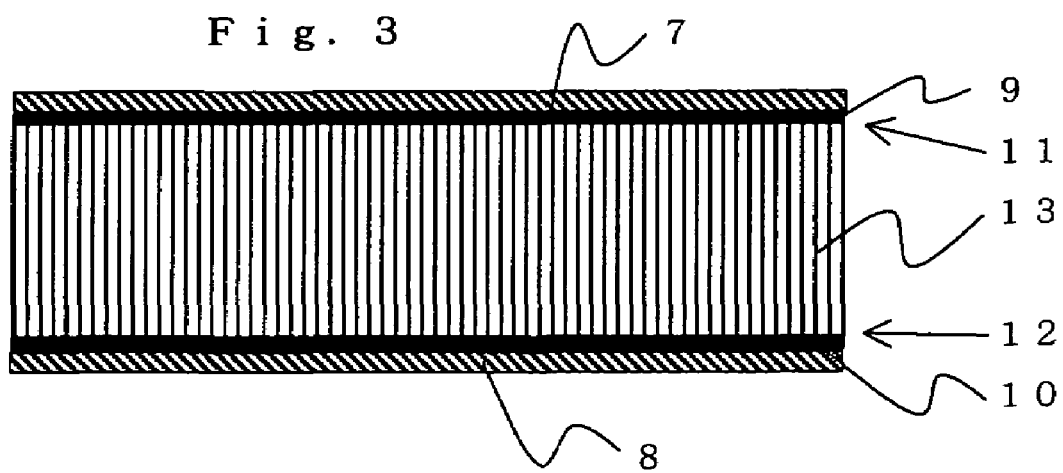
FIG. 3 is an illustration schematically showing a cross section in a thickness direction of a composite fiber structure according to the invention, in which numerals 7 and 8 denote polyester woven knitted fabrics, 9 and 10 denote adhesion layers, 11 and 12 denote cut surfaces, and 13 denotes a polyester elastic fiber structure.

50% (by weight) of the same elastic conjugate fibers B as used in Example 1 and 50% (by weight) of the conjugate short fibers A were mixed and spun and passed through a roller card, Crossley and a roller card in this order, and then the web was folded into a pleated form as shown in FIG. 2 by using Struto Equipment, produced by Struto International, Inc. to orient most of fibers in the thickness direction, followed by subjecting to a heat adhesion treatment among fibers in a heat-treating furnace at 200° C., to obtain a polyester elastic fiber structure (T/W: 3.9, basis weight: 750 g/m², thickness: 30 mm, density: 0.025 g/cm³) The outer surface side and the back surface side of the structure were sliced to a thickness of 3 mm, and the structure was sliced at the center to produce a sheet material having a thickness of 12 mm. It was accumulated on a polyester thick fabric sheet having been subjected to a preliminary crimping process as an outer fabric and a polyester tricot fabric as a backing fabric, with polyester net hot-adhesion melting sheets (Dynac Sheet G-4000, a trade name, produced by Toyobo Co., Ltd.) intervening between them, and then subjected to lamination adhesion at 160° C. to obtain a composite fiber sheet having the outer and backing fabrics adhered thereto. The composite fiber sheet was placed in a metallic mold for molding a composite fiber structure under heat and subjected to heat molding at 200° C. for 30 seconds, so as to produce a composite fiber structure having a curved breast cup shape.

The resulting composite fiber structure was Class 3 for cutting property, 480 mN for elasticity, Class 3 for moldability of the composite fiber structure, and Class 4 for softness. The composite fiber structure had flat surfaces.

INDUSTRIAL APPLICABILITY

According to the invention, such a composite fiber structure and a method for producing the same are obtained that is excellent in softness and elasticity without impairing air permeability, washing durability, shape maintenance property and recyclability, and a fiber product, such as a breast cup, produced with the composite fiber structure is obtained. Therefore, the invention has a significant industrial value.

The invention claimed is:

1. A composite fiber structure comprising a polyester elastic fiber structure having adhered on both surfaces thereof polyester woven or knitted fabrics with a polyester adhesive, characterized in that the polyester elastic fiber structure satisfies the following requirements (1) to (5):
   (1) the polyester elastic fiber structure contains side-by-side or eccentric core/shell conjugate short fibers A, which contain two kinds of polyester different from each other in intrinsic viscosity, have microcrimps of from 30 to 60 crimps per 25 mm exhibited by latent crimps, and are applied with mechanical crimps of from 7 to 15 crimps per 25 mm, as a matrix, and
   dispersed and mixed therein elastic conjugate fibers B, which contain a thermoplastic elastomer having a melting point lower by 40° C. or more than the two kinds of polyester, and a nonelastic polyester, with at least the thermoplastic elastomer being exposed on a surface of the fibers,
   (2) has thermally fixed points formed by heat-melting the conjugate short fibers A and the elastic conjugate fibers B intersecting with each other,
   (3) has thermally fixed points formed with the elastic conjugate fibers B intersecting with each other, (4) has a mixing ratio of the conjugate short fibers A and the elastic conjugate fibers B of from 90/10 to 10/90, and (5) has a single filament fineness of the conjugate short fibers A of from 2 to 15 dtex.

2. The composite fiber structure according to claim 1, wherein both the two kinds of polyester different from each other in intrinsic viscosity forming the conjugate short fibers A are polyethylene terephthalate.

3. The composite fiber structure according to claim 1, wherein constitutional fibers of the polyester elastic fiber structure have attached on a surface thereof a surface treating agent comprising a polyesterester block copolymer as a major component, in an amount of from 0.02 to 5.0% by weight based on a total weight of the polyester elastic fiber structure.

4. The composite fiber structure according to claim 1, wherein the conjugate short fibers A and the elastic conjugate fibers B contained in the polyester elastic fiber structure are oriented in a thickness direction of the polyester elastic fiber structure.

5. The composite fiber structure according to claim 4, wherein a surface of the polyester elastic fiber structure, to which the polyester woven or knitted fabrics are adhered, is a sliced cut surface.

6. A fiber product selected from the group consisting of a cup for breast, a shoulder pad, a hip pad, a pad for an office chair or a vehicle chair, a partition panel, an athletic supporter and a surface material for shoes, the fiber product comprising the composite fiber structure according to claim 1.

7. A method for producing a composite fiber structure characterized by heat-treating a web comprising side-by-side or eccentric core/shell conjugate short fibers A, which contain two kinds of polyester different from each other in intrinsic viscosity by from 0.1 to 0.4 and are applied with mechanical crimps of from 7 to 15 crimps per 25 mm, and elastic conjugate fibers B, which contain a thermoplastic elastomer having a melting point lower by 40° C. or more than the two kinds of polyester, and a nonelastic polyester, with at least the thermoplastic elastomer being exposed on a surface of the fibers, at a temperature equal to or higher than the melting point of the thermoplastic elastomer, so as to obtain a polyester elastic fiber structure satisfying the following requirements (1) to (5):

(1) the polyester elastic fiber structure contains side-by-side or eccentric core/shell conjugate short fibers A, which contain two kinds of polyester polymers different from each other in intrinsic viscosity, have microcrimps of from 30 to 60 crimps per 25 mm exhibited by latent crimps, and are applied with mechanical crimps of from 7 to 15 crimps per 25 mm, as a matrix, and dispersed and mixed therein elastic conjugate fibers B, which contain a thermoplastic elastomer having a melting point lower by 40° C. or more than the two kinds of polyester polymers, and a nonelastic polyester, with at least the thermoplastic elastomer being exposed on a surface of the fibers, (2) has thermally fixed points formed by heat-melting the conjugate short fibers A and the elastic conjugate fibers B intersecting with each other, (3) has thermally fixed points formed with the elastic conjugate fibers B intersecting with each other, (4) has a mixing ratio of the conjugate short fibers A and the elastic conjugate fibers B of from 90/10 to 10/90, and (5) has a single filament fineness of the conjugate short fibers A of from 2 to 15 dtex, and then laminating and adhering on both surfaces of the polyester elastic fiber structure polyester woven or knitted fabrics with a polyester adhesive as a hot-melt resin binder.

8. The method for producing a composite fiber structure according to claim 7, wherein the web has a fiber density in a range of from 0.009 to 0.04 g/cm$^3$.

9. The method for producing a composite fiber structure according to claim 7, wherein a heat-treating temperature of the web is a temperature that is equal to or higher than a melting point of the thermoplastic elastomer contained in the elastic conjugate fibers B, and is lower by 30° C. or more than the two kinds of polyester contained in the conjugate short fibers A.

10. The method for producing a composite fiber structure according to claim 7, wherein the polyester elastic fiber structure has attached on a surface thereof a surface treating agent comprising a polyesterester block copolymer as a major component, in an amount of from 0.02 to 5.0% by weight based on a total weight of the polyester elastic fiber structure.

11. The method for producing a composite fiber structure according to claim 7, wherein the conjugate short fibers A and the elastic conjugate fibers B contained in the polyester elastic fiber structure are oriented in a thickness direction of the polyester elastic fiber structure.

12. The method for producing a composite fiber structure according to claim 11, wherein a surface of the polyester elastic fiber structure, to which the polyester woven or knitted fabrics are adhered, is a sliced cut surface.

13. A fiber product selected from the group consisting of a cup for breast, a shoulder pad, a hip pad, a pad for an office chair or a vehicle chair, a partition panel, an athletic supporter and a surface material for shoes, the fiber product comprising the composite fiber structure according to claim 2.

14. A fiber product selected from the group consisting of a cup for breast, a shoulder pad, a hip pad, a pad for an office chair or a vehicle chair, a partition panel, an athletic supporter and a surface material for shoes, the fiber product comprising the composite fiber structure according to claim 3.

15. A fiber product selected from the group consisting of a cup for breast, a shoulder pad, a hip pad, a pad for an office chair or a vehicle chair, a partition panel, an athletic supporter and a surface material for shoes, the fiber product comprising the composite fiber structure according to claim 4.

16. A fiber product selected from the group consisting of a cup for breast, a shoulder pad, a hip pad, a pad for an office chair or a vehicle chair, a partition panel, an athletic supporter and a surface material for shoes, the fiber product comprising the composite fiber structure according to claim 5.

* * * * *